Jan. 24, 1956      D. E. SUNSTEIN      2,732,492
IMPROVED AMPLIFIER-DETECTOR CIRCUIT
Filed Feb. 11, 1953      2 Sheets-Sheet 1
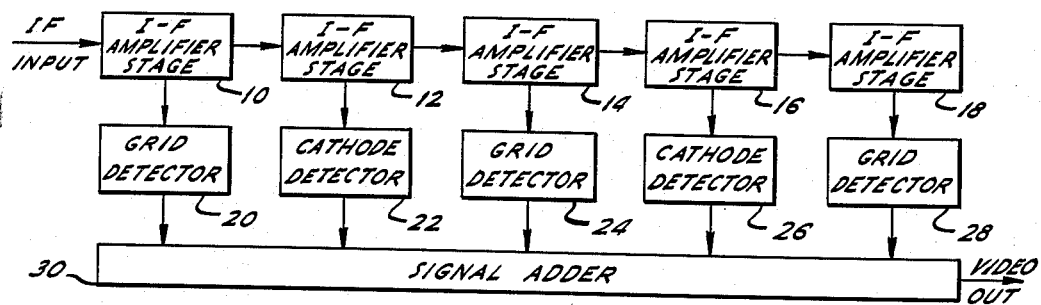
FIG. 1.
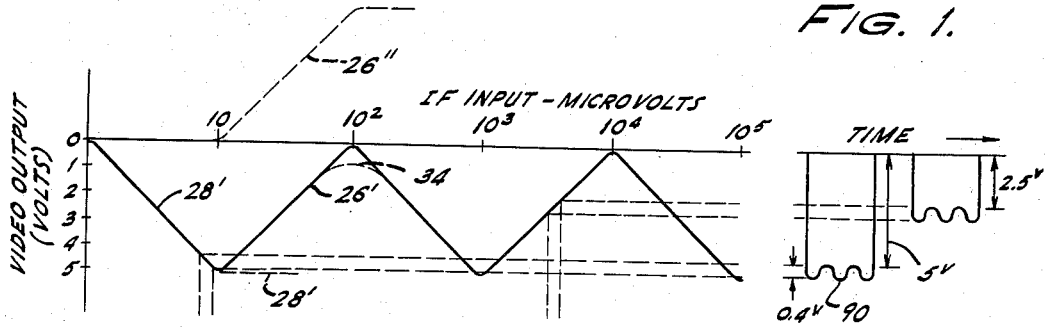
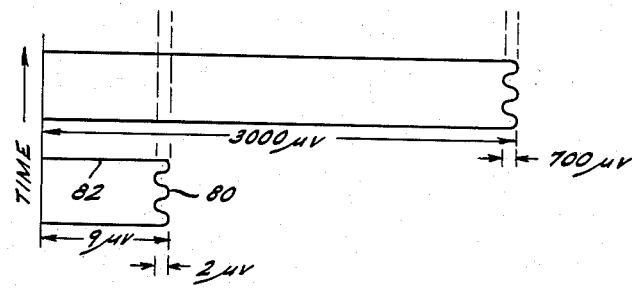
FIG. 3.
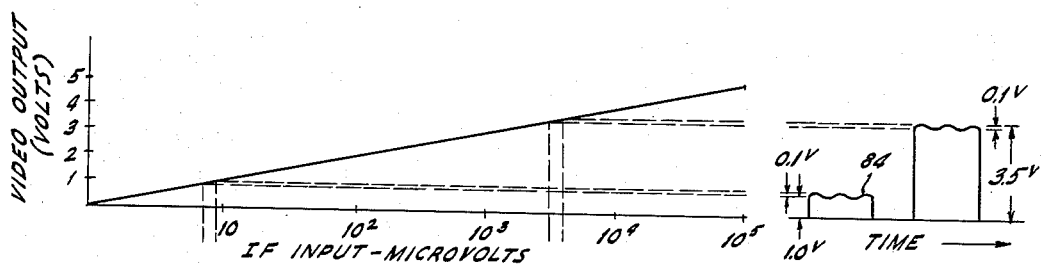
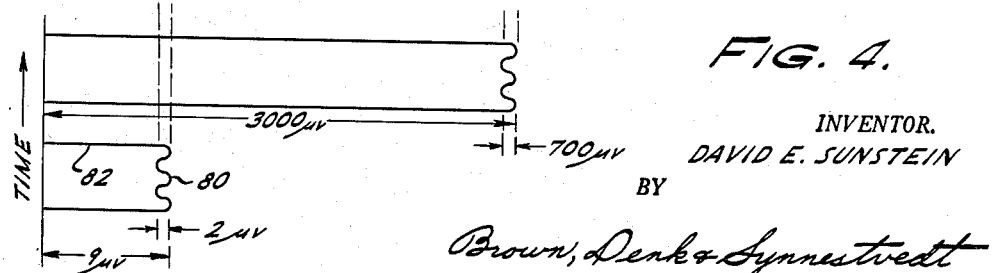
FIG. 4.
INVENTOR.
DAVID E. SUNSTEIN
BY
Brown, Denk & Synnestvedt
AGENTS

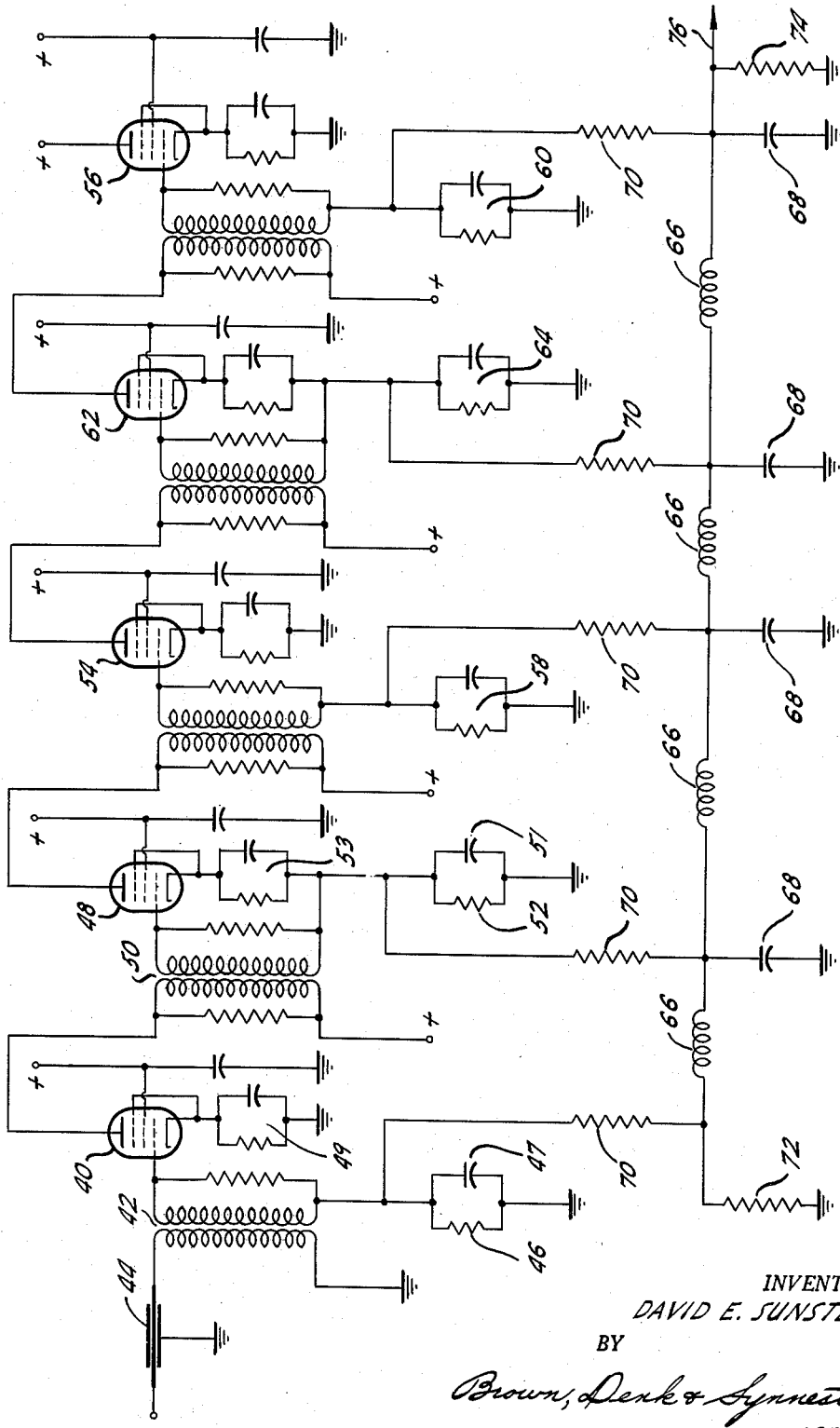

United States Patent Office 2,732,492
Patented Jan. 24, 1956

2,732,492
IMPROVED AMPLIFIER-DETECTOR CIRCUIT

David E. Sunstein, Bala-Cynwyd, Pa., assignor to Philco Corporation, Philadelphia, Pa., a corporation of Pennsylvania Application February 11, 1953, Serial No. 336,250

14 Claims. (Cl. 250—20)

This invention relates to signal amplifiers and more particularly to an improved intermediate frequency amplifier and detector circuit.

In the field of radar detection of moving objects, the dynamic range of input signals that must be processed greatly exceeds the limitations of conventional linear intermediate frequency amplifiers and detectors and the video delay and subtraction circuits that follow the detectors. For example, it may be desirable to construct a radar system that will detect moving targets within a region of space centered at the radar system and extending for several miles in every direction. It is well known that, in a non-coherent moving target detection system, the moving target signal appears as a modulation superimposed on the ground clutter signal. It is also well known that the amplitude of the signal returned from a target drops off rapidly as the range of the target to the radar system increases. To take a specific example, the amplitude of a signal returned from a distant target might be as much as 102 db below the amplitude of signals returned from nearby objects. Therefore any increase in range or sensitivity of a moving target detection system must be accompanied by an increase in the dynamic range of signals that can be handled by the receiver and associated circuits without limiting or otherwise distorting the signal in a manner which will cause a loss of the intelligence contained therein. Linear intermediate frequency amplifiers and detectors will not pass a sufficiently wide amplitude range of signals without limiting unless very special and expensive techniques are employed, such as providing extremely high anode potentials on the final stages of an I. F. amplifier and providing elaborate and expensive gain control circuits. Even if the signals are passed through the intermediate frequency amplifier and detector without limiting, the limited dynamic range of the video delay and subtraction system— typically less than 40 db—will cause a loss of signal intelligence. The problems mentioned above are by no means limited to moving target detection systems but they are so apparent in such systems that the latter serve as excellent illustrations.

The limitations of the linear intermediate frequency amplifiers have been overcome in part by logarithmic amplifier circuits of the type disclosed and claimed in my copending application Serial No. 675,848, filed June 11, 1946. Patent No. 2,662,978, granted December 15, 1953. Logarithmic intermediate frequency amplifiers of this type eliminate the possibility of clipping in the intermediate frequency amplifier but the logarithmic characteristic tends to decrease the modulation signal superimposed on the ground clutter below the noise level of the video delay and subtraction circuits. If the characteristic is adjusted so that the modulation signal superimposed on the smallest expected ground clutter signal is just equal to or slightly above the noise level of the video circuits, ground clutter signals at short ranges will be at a greater amplitude than the video circuits can handle without limiting. It will be remembered that a typical video delay and subtraction circuit of a moving target detection system must pass the entire ground clutter signal in order to detect the modulation superimposed thereon. In other words, the maximum dynamic range of the video signal is set on the one hand by the maximum amplitude signal the video circuits will pass without limiting, and on the other hand by the noise level inherent in the video circuits. As suggested above, the useful dynamic range of typical video delay and subtraction circuits is of the order of 20 to 40 db.

Attempts have been made to overcome the limited dynamic range of the video delay and subtraction circuits through the use of so-called "zig-zag" video amplifiers before the delay and subtraction units. A zig-zag amplifier is an amplifier in which the output signal amplitude alternately increases and decreases as a function of the amplitude of the input signal. This is generally accomplished in video zig-zag amplifiers by connecting several tubes having a sharp suppressor characteristic to a common plate load resistor. The suppressor grids are returned to ground and cathode degeneration is provided in the cathode circuit of each tube. The input signal is applied to the several tubes at graduated amplitude levels and the biases are so arranged that, when one tube is cut off by suppressor grid bias developed across the cathode load, another tube starts to conduct. It is obvious that, while such a zig-zag video amplifier may be useful under certain conditions, it is of little value in moving target detection systems unless some means are provided for preventing overloading in the intermediate frequency amplifier. Furthermore, it is uneconomical to provide both a logarithmic intermediate frequency amplifier and a zig-zag video circuit in the same system if the same effect can be obtained in the intermediate frequency amplifier alone.

Therefore, it is an object of the present invention to provide a novel carrier frequency amplifier which will compress the dynamic ranges of signals passing therethrough without a corresponding decrease in the amplitude of the modulation components of such signals.

It is a further object of the present invention to provide a novel carrier frequency amplifier having a superior output versus input signal amplitude characteristic.

It is a further object of the present invention to provide a carrier frequency amplifier having a zig-zag output versus input characteristic without the use of special tubes and/or circuit elements.

It is a further object of the present invention to provide an improved carrier frequency amplifier which combines the advantages of a logarithmic and a zig-zag output versus input characteristic.

These and other objects of the invention which will become apparent as the description proceeds are generally accomplished by connecting a number of combined amplifier and detector stages in cascade. The circuits are arranged so that the polarity of the detected signal alternates from stage to stage. The outputs of all stages are combined additively to provide an output signal.

For a better understanding of the invention, together with other and further objects thereof, reference should now be made to the following detailed description which is to be read in conjunction with the accompanying drawings in which:

Fig. 1 is a block diagram of one embodiment of the invention;

Fig. 2 is a schematic diagram of a second preferred embodiment of the invention;

Fig. 3 is a plot showing the output versus input characteristic of the embodiments of Figs. 1 and 2; and Fig. 4 is a plot showing the output versus input characteristic of a typical logarithmic intermediate frequency amplifier.

Reference should now be made to Fig. 1 which shows an embodiment of the present invention employing five intermediate frequency amplifier stages 10, 12, 14, 16 and 18 connected in cascade. Each amplifier stage, except stage 10, receives a signal from the preceding stage, and each stage, except stage 18, supplies its output to the immediate following stage. Stage 10 is supplied with an input signal from a mixer or a conventional intermediate amplifier stage not shown in Fig. 1. Preferably the embodiment of Fig. 1 employs a number of stages sufficient to cause some detection of noise in the output of the amplifier.

The outputs of amplifiers 10 and 14 in the embodiment shown in Fig. 1, in addition to being supplied to the immediately succeeding stages, are supplied to grid detector circuits 20 and 24. The output of stage 18 is supplied to a third grid detector circuit 28. Stages 12 and 16 supply signals to cathode detector circuits 22 and 26. The cathode detector circuits provide video signals that have a polarity opposite to that of the video signal supplied to the grid detector circuits. In general, a detector circuit is provided for every stage of the intermediate frequency amplifier which will overload in response to an input signal of the maximum intensity likely to be received by the amplifier. These detectors may be separate circuits energized by the stages 10, 12, 14, 16 and 18, or the amplifier stages may perform the dual function of amplification and detection in a manner to be explained in connection with the description of Fig. 2. The amplifier stages 10, 12, 14, 16 and 18 are arranged so that, as the amplitude of the signal supplied to the input of stage 10 increases, successive stages, starting with stage 18 and proceeding in the direction of stage 10, will overload. The circuits are so arranged that, when a given stage overloads, the detector circuit associated therewith will start to function. Thus, for example, when stage 18 overloads, detector 28 will begin to function and, when stage 16 overloads (stage 18 having previously overloaded), detector 26 will commence to function. It will be seen that the number of detector circuits in operation will depend upon the amplitude of the signal supplied to stage 10 which, in turn, determines the number of overload stages in the intermediate frequency amplifier. The video output signals of all detector circuits are fed to a signal adder circuit 30 in which they are combined algebraically to produce the net video output signal. Preferably signal adder circuit 30 includes suitable means for delaying, by successively greater amounts, the signals from detector circuits 26, 24, 22 and 20, respectively, in order that compensation may be made for the transit time of the intermediate frequency signal through the several amplifier stages. This compensation for the transit time through the amplifier stages causes the output signals from the various detectors to be in phase at the common output terminal. This is particularly important when the amplifier is to operate with pulse signals which have a duration of the order of the transit time of signals through the amplifier.

The output versus input signal amplitude characteristic of the embodiment shown in Fig. 1 is illustrated by the plot of Fig. 3. If the gain of the various amplifier stages is made sufficiently high, stage 18 will start to limit for very low values of input signals, for example of the order of one microvolt. Limiting of amplifier 18 causes grid detector 28 to produce a video output signal which is proportional to the amplitude of the input signal. This output signal is assumed to be negative with respect to ground due to the fact that detector 28 is a grid detector. The output of detector 28 is represented by line 28′ in Fig. 3. If the amplitude of the input signal is increased beyond the point where limiting in stage 16 is complete, the output of detector 28 will remain constant, as indicated by the broken line 28′ of Fig. 3, owing to the fact that the amplitude of the input signal supplied to amplifier stage 18 does not increase. The output of cathode detector 26 is a positive signal proportional in amplitude to the amplitude of the input signal supplied to amplifier 10. This signal is represented in Fig. 3 by the broken line 26″. The algebraic summation of the negative signal from grid detection 28 and the positive signal from cathode detector 26 will produce the portion of the characteristic curve designated as 26′ in Fig. 3. In the example shown in Fig. 3, it is assumed that each of the intermediate frequency amplifier stages has a gain of 10. Therefore stage 18 will saturate at an input level of 10 microvolts, stage 16 at 100 microvolts and stage 14 at 1000 microvolts.

In Fig. 3 the intermediate frequency input has been plotted on a logarithmic scale to show the regularity of the zig-zag waveform produced by the circuit of Fig. 1.

For reasons that will appear as the description proceeds, it is desirable that the characteristic curve exhibit abrupt changes in slope as shown by the solid line 28′—26′ in Fig. 3. If the characteristic curve is permitted to take the form shown by the broken curve 34, modulation signals superimposed on input signals occurring at this and other corresponding amplitude levels will produce a very small video output signal in proportion to modulation signals superimposed on input signals at different amplitude levels. In the event that the characteristics of the amplifier stages are such as to produce excessive rounding of the characteristic curve, it may be desirable to insert sharp cut-off limiters between the various amplifier stages to produce the desired abrupt changes in slope of the characteristic curve. Alternatively, a nonlinear diode may be inserted between signal adder 30 of Fig. 1 and the following video circuits to provide peak expansion of the output signal and thereby to compensate for the rounding produced by the amplifier detector stages.

It would be well to keep in mind that the circuit of the present invention is intended for applications in which the amplitude of the input signal, apart from the modulation component superimposed thereon, is of little interest except insofar as it determines the dynamic ranges of the various circuit components. However, even though the signal carrying the modulation is of little interest, it must be amplified and detected in order that the modulation component superimposed thereon may be recovered. Maximum sensitivity of the system is realized if the maximum output of the signal adder 30 is made equal to the maximum amplitude that can be handled by the video circuits that follow the intermediate frequency amplifier. Thus the zig-zag characteristic of the embodiment of Fig. 1 maximizes the gain of the modulation component by sacrificing the monotonic relationship between output and input signal amplitudes usually found in conventional intermediate frequency amplifiers.

It will be apparent that the invention may be practiced by employing detectors which are all of a similar nature if inverters are inserted between alternate detectors and signal adder circuit 30. However, since one of the primary objects of the invention is to reduce the complexity of circuits for handling signals covering a wide range of amplitude levels, the arrangement of Fig. 1 is preferred.

In keeping with the above stated object of reducing the complexity of the circuitry, the embodiment of Fig. 2 combines an amplifier and a detector stage into a single stage employing only one vacuum tube. In Fig. 2, electron tube 40 is provided with an input coupling transformer 42 whose primary winding is connected to a terminal 44, to which may be supplied the intermediate frequency signal to be amplified and detected. The secondary winding of transformer 42 is returned to ground through a video load resistor 46 shunted by an I.-F. bypass capacitor 47. The cathode of tube 40 is returned to ground through the usual self-bias arrangement 49 as shown, and the screen grid and suppressor grid are connected in the usual manner. Intermediate frequency components of current in the anode circuit of tube 40 are coupled to the grid circuit of tube 48 by means of interstage coupling transformer 50. The cathode of tube 48 is returned to ground through a resistor-capacitor bias network 53 in series with the parallel combination of video load impedance 52 and I.-F. bypass capacitor 51.

The secondary winding of transformer 50 is returned to the junction of bias network 53 and resistor 52. Similarly tubes 54 and 56 are provided with video load impedances 58 and 60 in their respective grid circuits, while tube 62 is provided with a video impedance 64 in its cathode circuit. It will be seen that the amplifier stages including tubes 40, 54 and 56 are provided with means for accomplishing grid detection whenever the signal supplied to one of these stages reaches the overload point of that stage. Similarly, the alternate stages including tubes 48 and 62 are provided with means for accomplishing cathode detection when driven beyond their normal operating range. Video load impedances 46, 52, 58, 60 and 64 are connected to spaced taps on a video delay line and adding circuit comprising series inductors 66 and shunt capacitors 68. Suitable isolating resistors 70 are provided between the video loads and the delay line for decoupling purposes. The delay line is terminated at either end by resistors 72 and 74 which have a resistance equal to the characteristic impedance of the delay line. Therefore resistors 72 and 74 serve as reflectionless terminations for the delay line. The combined video output signal appears across resistor 74, and a suitable connection 76 is provided for supplying this signal to a utilizing circuit. The values of inductors 66 and capacitors 68 are so chosen that the delay between successive tapping points is exactly equal to the transit time of the signal through the corresponding amplifier-detector stage.

The combined amplifier detector circuit of Fig. 2 will have an output versus input characteristic substantially identical to that shown in Fig. 3. Each stage of the amplifier-detector will act as an amplifier for all signals below the limiting level of the stage. For signals having amplitudes above the limiting level but below the saturation level, each stage will act as a detector with the detected output appearing across the video load impedance of the stage.

The advantages of embodiments of the present invention over logarithmic amplifier-detector circuits known in the prior art are illustrated by the following example which has been reproduced in graphic form in Figs. 3 and 4.

Suppose that the maximum signal to be supplied to a conventional intermediate frequency amplifier-detector circuit is of the order of $10^5$ $\mu$ volts. Suppose further that it is desired to detect the modulation on signals that have a minimum amplitude of 9 $\mu$-volts. Assume that the video circuits following the amplifier-detector can handle a maximum signal of 5 volts, and that a signal of 0.1 volt is indistinguishable from the noise. This assumes a 50-to-1 or 34 db dynamic range for the video circuits. It can be seen from Fig. 4 that a 2 $\mu$-volt peak-to-peak modulation signal 80 superimposed on the 9 $\mu$-volt signal, the envelope of which is shown at 82, will be required to produce the minimum detectable 0.1 volt video signal 84. This 2 $\mu$-volt signal 80 is only 94 db below the maximum expected signal. In making this calculation it is assumed that the one volt video signal derived from the 9 $\mu$-volt signal 82 is subtracted out in the video circuits leaving only the 2 $\mu$-volt modulation signal to be compared with the noise level.

Suppose now that the conditions remain the same except that the zig-zag amplifier-detector of Fig. 1 or 2 is substituted for the logarithmic amplifier-detector. As shown in Fig. 3, the 2 $\mu$-volt modulation signal 80, which produced the barely distinguishable 0.1 volt video signal, now produces a 0.4 volt video signal 90 which is easily distinguishable since it is four times the noise level in the video circuit. Similarly, a 700 $\mu$-volt modulation signal superimposed on a 3000 $\mu$-volt signal produces an easily detectable 0.4 volt video signal.

It can be seen from Fig. 3 that the 9 $\mu$-volt input signal produces a video signal of approximately 5 volts amplitude while the 3000 $\mu$-volt input signal produces a video signal of only 2.5 volts amplitude. This is of no importance if only the modulation superimposed on these signals is to be utilized. A simple computation will show that, under the conditions assumed above, the zig-zag intermediate frequency amplifier-detector comprising my invention will detect a 0.6 $\mu$-volt modulation signal superimposed on a 9 $\mu$-volt signal. This signal is approximately 105 db below the maximum signal received by the amplifier or a gain of approximately 11 db over the conventional logarithmic amplifier-detector. A still greater improvement may be obtained by increasing the number of serially-connected amplifier-detector stages provided they are so connected that the video output signals of successive stages are of opposite polarity and provided further that the noise level in the amplifier-detector circuits does not become excessive.

The numbers chosen for the above example should not be construed as representing optimum operating values. It is at once apparent that the 34 db dynamic range assumed for the video circuit is considerably greater than that obtainable under certain operating conditions. However, under any conditions, the degree of improvement over straight logarithmic amplifier-detector circuits will be of the order determined above.

The zig-zag intermediate frequency amplifier-detector may also be compared with a conventional logarithmic amplifier and detector circuit in terms of the dynamic range required in the video circuit following the amplifier to give equal sensitivity. To maintain the same slope of the characteristic curve as shown in Fig. 3, in a conventional logarithmic amplifier-detector having a maximum input signal of $10^5$ $\mu$-volts, would require video circuits having a useful dynamic range extending from 0.1 volt to 25 volts, or a range of 48 db, which is an impossible requirement in currently available video delay and subtraction circuits. It is unnecessary to point out that a linear intermediate frequency amplifier-detector could not be constructed to handle the range of signals shown in Fig. 3 unless provided with an elaborate gain control system.

As suggested above, the usefulness of the present invention is not limited to moving target detection systems since it will give performance superior to that of conventional linear and logarithmic amplifier-circuits in all instances where it is desirable to detect the modulation or other variation in amplitude superimposed on signals that may vary widely in amplitude.

It is obvious that various changes and modifications may be made in the embodiments shown and described without departing from the spirit and scope of the invention. For example, the invention may take the form of two stages having a positive detected output signal followed by two having a negative output signal, and so in in pairs. The only disadvantage of this arrangement is that the dynamic range of the video signal is increased while the slope of the characteristic curve remains the same. Similarly the stages having positive and negative detector outputs may be arranged at random—for example 3 positive, 1 negative, 2 positive, 4 negative—which will give a reduced video dynamic range but an irregular characteristic. The maximum outputs of the various detector circuits and the gain of the various amplifier stages may be unequal. However, all of these modifications will cause the output versus input signal amplitude characteristic of the amplifier to depart from what is at present considered to be the preferred relationship. Other changes such as employing single tuned interstage coupling networks, different biasing arrangements or other forms of video load impedances may be made in the circuit shown in Fig. 2 without departing from the invention.

Therefore, while I have described what are at present considered to be the preferred embodiments of my invention, the scope thereof is defined with greater particularity by the hereinafter appended claims.

What is claimed is:

1. A signal amplifier-detector circuit for providing an output signal which changes substantially for relatively small percentage changes in the amplitude of the input signal supplied thereto, said circuit comprising a plurality of carrier frequency amplifier stages connected in cascade, means for supplying an input signal to the first amplifier in said cascade arrangement, detector means associated with more than one of said amplifier stages, and means for combining the outputs of said detector means, said combining means being so constructed and arranged that the detected output of at least one of said detector means tends to cancel the detected output of at least one other detector means.

2. A signal amplifier-detector circuit for providing an output signal which changes substantially for relatively small percentage changes in the amplitude of the input supplied thereto, said circuit comprising means including a plurality of cascade-connected amplifier-detector stages for amplifying and detecting the carrier frequency components of an input signal supplied thereto, said amplifying and detecting means being constructed and arranged to cause the detected outputs of the respective amplifier-detector stages to vary with input signal amplitude over selected amplitude ranges of the input signal and to vary to a much lesser extent at other amplitude ranges of the input signal, and means for combining the outputs of said amplifier-detector stages, said combining means being so constructed and arranged that the detected output of at least one of said amplifier-detector stages tends to cancel the detected output of at least one other amplifier-detector stage.

3. A signal amplifier-detector circuit for providing an output signal which changes substantially for relatively small percentage changes in the amplitude of the input signal supplied thereto, said circuit comprising means including a plurality of cascade-connected carrier frequency amplifier stages for amplifying the carrier frequency components of an input signal supplied thereto, detector means associated with more than one of said amplifier stages and means for combining the outputs of said detector means, said combining means being so constructed and arranged that the detected output of at least one of said detector means tends to cancel the detected oupu of a least one other detector means, said means for amplifying the carrier frequency component of the input signal being constructed and arranged to cause signals supplied by the respective amplifier stages to the associated detector stages to vary with input signal amplitude over selected amplitude ranges of the input signal and to remain substantially constant at other amplitude ranges of the input signal.

4. A signal amplifier-detector circuit for providing an output signal which changes substantially for relatively small percentage changes in the amplitude of the input signal supplied thereto, said circuit comprising means including a plurality of cascade-connected amplifier-detector stages for amplifying and detecting the carrier frequency components of an input signal supplied thereto, said amplifying and detecting means being constructed and arranged to cause the detected outputs of the respective amplifier-detector stages to vary with input signal amplitude over selected amplitude ranges of the input signal and to vary to a much lesser extent at other amplitude ranges of the input signal, and means for combining the outputs of said amplifier-detector stages, said combining means being so constructed and arranged that the detected outputs of regularly spaced amplifier-detector stages in said cascade arrangement tend to cancel the detected outputs of other amplifier-detector stages in said cascade arrangement.

5. A carrier frequency amplifier-detector circuit having a zig-zag output versus input signal amplitude characteristic, said amplifier-detector circuit comprising a plurality of amplifier-detector stages, the amplifier portions of the several stages being connected in cascade, means for supplying a carrier frequency signal to be amplified to the input of the first amplifier portion in said cascade arrangement, said amplifier-detector stages being constructed and arranged to cause the detector portions of successive stages to be rendered initially operative at progressively higher amplitudes of the signal supplied to said first amplifier portion, and means for combining the outputs of said amplifier-detector stages, said combining means being so constructed and arranged that the detected output of at least one of said amplifier-detector stages tends to cancel the detected output of at least one other amplifier-detector stage.

6. A carrier frequency amplifier-detector circuit having a zig-zag output versus input signal amplitude characteristic, said amplifier-detector circuit comprising a plurality of amplifier-detector stages, the amplifier portions of the several stages being connected in cascade, means for supplying a carrier frequency signal to be amplified to the input of the first amplifier portion in said cascade arrangement, said amplifier-detector stages being constructed and arranged to cause the detector portions of successive stages to be rendered initially operative at progressively higher amplitudes of the signal supplied to said first amplifier portion, the detected output of at least one of said amplifier-detector stages being of opposite polarity to the detected outputs of the other of said amplifier-detector stages, said signal adding means associated with each of said detector portions and arranged to provide a combined detector output signal proportional in amplitude to the algebraic sum of the detected outputs of the several amplifier-detector stages.

7. A carrier frequency amplifier-detector circuit having a zig-zag output versus input signal amplitude characteristic, said amplifier-detector circuit comprising a plurality of amplifier-detector stages, the amplifier portions of the several stages being connected in cascade, means for supplying a carrier frequency signal to be amplified to the input of the first amplifier portion in said cascade arrangement, said amplifier-detector stages being constructed and arranged to cause the detector portions of successive stages to be rendered initially operative at progressively higher amplitudes of the signal supplied to said first amplifier portion, said amplifier-detector stages including means for limiting the amplitudes of the carrier frequency signals supplied to the detector portions of each of said stages thereby causing the maximum amplitudes of the output of said detector portions to be limited, the detected output of at least one of said amplifier-detector stages being of opposite polarity to the detected output of the other of said stages, and signal adding means associated with each of said detector portions and arranged to provide a combined detected output signal proportional in amplitude to the algebraic sum of the detected outputs of said plurality amplifier-detector stages.

8. A carrier frequency amplifier-detector circuit having a zig-zag output versus input signal amplitude characteristic, said amplifier-detector circuit comprising a plurality of amplifier-detector stages, the amplifier portions of said stages being connected in cascade, means for supplying a carrier frequency signal to be amplified to the first amplifier portion of said cascade arrangement, said amplifier-detector stages being constructed and arranged to cause the detector portions of successive stages to be rendered initially operative at progressively higher amplitudes of the signal supplied to said first amplifier portion, said amplifier-detector stages including means for limiting the amplitudes of the carrier frequency signals supplied to the detector portions of said plurality of stages thereby causing the amplitudes of the detected outputs thereof to be limited, the detected output of at least one of said amplifier-detector stages being of opposite polarity to the detected outputs of the other of said stages, the stages having a detected output of one polarity alternating in a regular fashion with stages having a detected output of the opposite polarity, and signal adding means associated with each of said detector portions and arranged to provide a combined detected output signal proportional in amplitude to the algebraic sum of the detected outputs of said plurality of amplifier-detector stages.

9. A carrier frequency amplifier-detector circuit having a zig-zag output versus input signal amplitude characteristic, said amplifier-detector circuit comprising a plurality of amplifier-detector stages, the amplifier portions of said stages being connected in cascade, means for supplying a carrier frequency signal to be amplified to the first amplifier portion in said cascade arrangement, each of said amplifier portions including means for limiting the amplitude of the signal supplied to the following amplifier portion in said cascade arrangement, the detector portions of each of said stages being arranged to be rendered operative by the limiting action of the amplifier portion associated therewith, the detected output of at least one of said stages being of opposite polarity to the detected output of the other of said stages, and signal adding means associated with each of said detector portions and arranged to provide a combined detected output signal proportional in amplitude to the algebraic sum of the detected outputs of the several amplifier-detector stages.

10. A carrier frequency amplifier-detector circuit having a zig-zag output versus input signal amplitude characteristic, said amplifier-detector circuit comprising a plurality of amplifier-detector stages, the amplifier portions of said stages being connected in cascade, means for supplying a carrier frequency signal to be amplified to the first amplifier portion in said cascade arrangement, each of said amplifier portions including means for limiting the amplitude of the signal supplied to the following amplifier portion in said cascade arrangement, the detector portions of each of said stages being arranged to be rendered operative by the limiting action of the amplifier portion associated therewith, the detected outputs of successive stages being of substantially equal maximum amplitude and of opposite polarity, and signal adding means associated with each of said detector portions and arranged to provide a combined detected output signal proportional in amplitude to the algebraic sum of the detected outputs of the several amplifier-detector stages, said adding means including means for compensating for the transit time of the carrier frequency signal through said cascade arranged amplifier portions.

11. A carrier frequency amplifier-detector circuit having a zig-zag output versus input signal amplitude characteristic, said amplifier-detector circuit comprising a plurality of amplifier-detector stages, the amplifier portions of said stages being connected in cascade, means for supplying a carrier frequency signal to be amplified to the first amplifier portion in said cascade arrangement, each of said amplifier portions including means for limiting the amplitude of the signal supplied to the following amplifier portion in said cascade arrangement, the gain and limiting amplitude being substantially the same for all of said amplifier portions, the detector portions of each of said stages being arranged to be rendered operative by the limiting action of the amplifier portions associated therewith, the detected output of successive stages being of opposite polarity, and signal adding means associated with each of said detector portions and arranged to provide a combined detected output signal proportional in amplitude to the algebraic sum of the detected outputs of the said plurality of amplifier-detector stages.

12. A carrier frequency amplifier-detector circuit having a zig-zag output versus input signal amplitude characteristic, said amplifier-detector circuit comprising a plurality of amplifier-detector stages, the amplifier portions of said stages being connected in cascade, the detector portion associated with alternate amplifier portions in said cascade arrangement being in the form of a cathode detector circuit, the detector portions associated with the other amplifier stages in said cascade arrangement having the form of a grid detector circuit, each of said amplifier portions including means for limiting the amplitude of the signal supplied to the following amplifier portion in said cascade arrangement, the detector portions of each of said stages being arranged to be rendered operative by the limiting action of the amplifier portion associated therewith, and a delay line adding means associated with each of said detector portions and arranged to provide a combined detected output signal proportional in amplitude to the algebraic sum of the detected outputs of the several amplifier-detector stages.

13. A carrier frequency amplifier-detector circuit having a zig-zag output versus input signal amplitude characteristic, said amplifier-detector circuit comprising a plurality of single tube amplifier-detector stages, the amplifier portions of said stages being connected in cascade, alternate amplifier portions in said cascade arrangement being provided with video load impedances in the cathode circuits thereof, whereby said amplifier portions will operate as cathode detectors in response to input signals in excess of a predetermined amplitude and the other amplifier portions in said cascade arrangement being provided with video load impedances in the grid circuits thereof, said last-mentioned amplifier portions being arranged to operate as grid detectors in response to input signals in excess of a predetermined amplitude, each of said amplifier portions including means for limiting the signal supplied to the following amplifier portions in said cascade arrangement, a delay line signal adding means, means connecting said video load impedances to spaced taps on said delay line adding means, whereby said delay line adding means is arranged to provide a combined detected output signal proportional in amplitude to the algebraic sum of the detected outputs of the several amplifier-detector stages.

14. A carrier frequency amplifier-detector circuit having a zig-zag output versus input signal amplitude characteristic, said amplifier-detector circuit comprising a plurality of single tube amplifier-detector stages, the amplifier portions of said stages being connected in cascade, means for supplying a carrier frequency signal to be amplified to the first amplifier portion in said cascade arrangement, each of said amplifier portions including means for limiting the amplitude of the signal supplied to the following amplifier portion in said cascade arrangement, the gain and limiting amplitude being substantially the same for each of said amplifier portions in said cascade arrangement, alternate amplifier portions in said cascade arrangement being provided with video load impedances in the cathode circuits thereof, said last-mentioned amplifier portions being arranged to operate as cathode detector circuits in response to input signals in excess of the amplitude at which the amplifier portions commence their limiting action and the other of said amplifier portion being provided with video load impedances in the grid circuits thereof, said other amplifier portions being arranged to operate as grid detector circuits in response to input signals thereto having an amplitude in excess of the amplitude at which the amplifier portions commence their limiting action, a delay line signal adding circuit comprising a plurality of series inductors and shunt capacitors, means terminating said delay line at each end in its characteristic impedance, means coupling said video load impedances to spaced points on said delay line whereby said delay line adding means is arranged to provide a combined detected output signal proportional in amplitude to the algebraic sum of the detected outputs of the subject amplifier-detector stages.

References Cited in the file of this patent

UNITED STATES PATENTS

| | | |
|---|---|---|
| 1,947,569 | Posthumus | Feb. 20, 1934 |
| 1,981,342 | Black | Nov. 20, 1934 |
| 2,515,187 | Bliss | July 18, 1950 |
| 2,577,506 | Belleville | Dec. 4, 1951 |